United States Patent
Liu et al.

(10) Patent No.: US 10,783,380 B2
(45) Date of Patent: Sep. 22, 2020

(54) OBJECT COUNTING DEVICE, OBJECT COUNTING SYSTEM AND OBJECT COUNTING METHOD

(71) Applicant: VIVOTEK INC., New Taipei (TW)

(72) Inventors: Cheng-Chieh Liu, New Taipei (TW); Szu-Mo Chang, New Taipei (TW); Chih-Yen Lin, New Taipei (TW)

(73) Assignee: VIVOTEK INC., New Taipei (TW)

( * ) Notice: Subject to any disclaimer, the term of this patent is extended or adjusted under 35 U.S.C. 154(b) by 99 days.

(21) Appl. No.: 16/053,809

(22) Filed: Aug. 3, 2018

(65) Prior Publication Data
US 2019/0057518 A1    Feb. 21, 2019

(30) Foreign Application Priority Data

Aug. 15, 2017 (TW) .............................. 106127523 A

(51) Int. Cl.
*G06K 9/00* (2006.01)

(52) U.S. Cl.
CPC ............... *G06K 9/00778* (2013.01); *G06T 2207/30232* (2013.01); *G06T 2207/30242* (2013.01)

(58) Field of Classification Search
None
See application file for complete search history.

(56) References Cited

U.S. PATENT DOCUMENTS

2004/0238628 A1* 12/2004 Clark .................. G07C 9/00
                                                     235/382
2014/0333769 A1* 11/2014 Shibuya ................ H04N 7/183
                                                     348/148

FOREIGN PATENT DOCUMENTS

TW            200727204         7/2007

* cited by examiner

*Primary Examiner* — Justin P. Misleh
(74) *Attorney, Agent, or Firm* — Winston Hsu

(57) ABSTRACT

An object counting device includes an image capturer and a processor. The image capturer captures an image sequence related to a gate within a field of view. When an object in the image sequence passes through an entry/exit reference corresponding to the gate, the processor determines a moving direction of the object. When the processor determines that the object moves from a first side of the gate towards a second side of the gate, the processor counts the object into a first accumulated number. When the object exits from the field of view, the processor records an exit position of the object. The processor determines whether to count the object into a second accumulated number according to the exit position.

13 Claims, 8 Drawing Sheets

OBJECT COUNTING DEVICE, OBJECT COUNTING SYSTEM AND OBJECT COUNTING METHOD

BACKGROUND OF THE INVENTION

1. Field of the Invention

The invention relates to an object counting device, an object counting system and an object counting method and, more particularly, to an object counting device, an object counting system and an object counting method for determining the timing of counting an object according to a moving direction of the object.

2. Description of the Prior Art

With the advent of the era of big data, it has a tendency to use and analyze objective data to review or enhance service quality and operating efficiency of a specific site. Some sites have used cameras to track customers, so as to count the number of customers who enter or exit from the sites. Specifically, when some goods are placed around a gate of a store, the timing of counting the customers who enter or exit from the gate should be different, so as to improve the accuracy of counting the number of customers who enter or exit from the store. Furthermore, for public transportation (e.g. bus), the timing of counting the customers who enter or exit from the gate should also be different, so as to improve the accuracy of counting the number of customers who enter or exit from the public transportation.

SUMMARY OF THE INVENTION

An objective of the invention is to provide an object counting device, an object counting system and an object counting method for determining the timing of counting an object according to a moving direction of the object, so as to solve the aforesaid problems.

According to an embodiment of the invention, the object counting device comprises an image capturer and a processor. The image capturer captures an image sequence related to a gate within a field of view. The processor is electrically connected to the image capturer. The processor determines a moving direction of an object when the object in the image sequence passes through an entry/exit reference corresponding to the gate. The processor counts the object into a first accumulated number when the processor determines that the object moves from a first side of the gate towards a second side of the gate. The processor records an exit position of the object when the object exits from the field of view. The processor determines whether to count the object into a second accumulated number according to the exit position.

According to another embodiment of the invention, an object counting system comprises a plurality of object counting devices and a host device. Each of the object counting devices comprises an image capturer and a processor. The image capturer captures an image sequence related to a gate within a field of view. The processor is electrically connected to the image capturer. The processor determines a moving direction of an object when the object in the image sequence passes through an entry/exit reference corresponding to the gate. The processor counts the object into a first accumulated number when the processor determines that the object moves from a first side of the gate towards a second side of the gate. The processor records an exit position of the object when the object exits from the field of view. The processor determines whether to count the object into a second accumulated number according to the exit position. The host device communicates with the object counting devices. The host device receives a plurality of the first accumulated numbers and a plurality of the second accumulated numbers from the object counting devices, calculates a first sum of the first accumulated numbers, and calculates a second sum of the second accumulated numbers.

According to another embodiment of the invention, an object counting method comprises steps of capturing an image sequence related to a gate within a field of view; determining a moving direction of an object when the object in the image sequence passes through an entry/exit reference corresponding to the gate; counting the object into a first accumulated number when determining that the object moves from a first side of the gate towards a second side of the gate; recording an exit position of the object when the object exits from the field of view; and determining whether to count the object into a second accumulated number according to the exit position.

As mentioned in the above, when the object in the image sequence passes through the entry/exit reference corresponding to the gate, the invention determines the moving direction of the object first and then determines the timing of counting the object according to the moving direction of the object. Accordingly, the invention can improve the accuracy of counting the number of customers who enter or exit from a specific site (e.g. store, public transportation, etc.) effectively.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
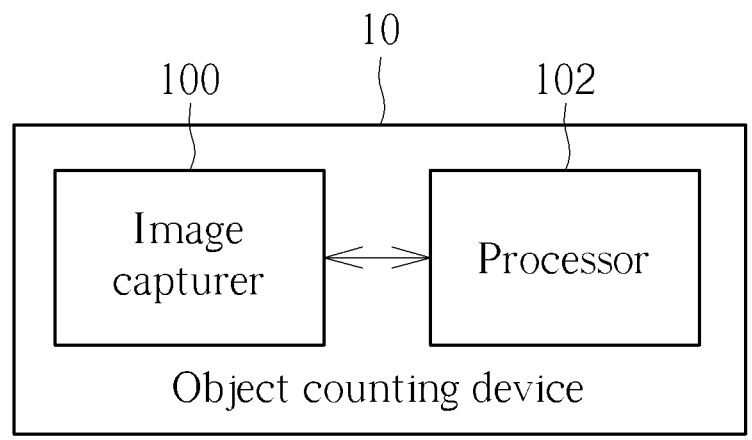
FIG. 1 is a functional block diagram illustrating an object counting device according to an embodiment of the invention.
Figure 2:
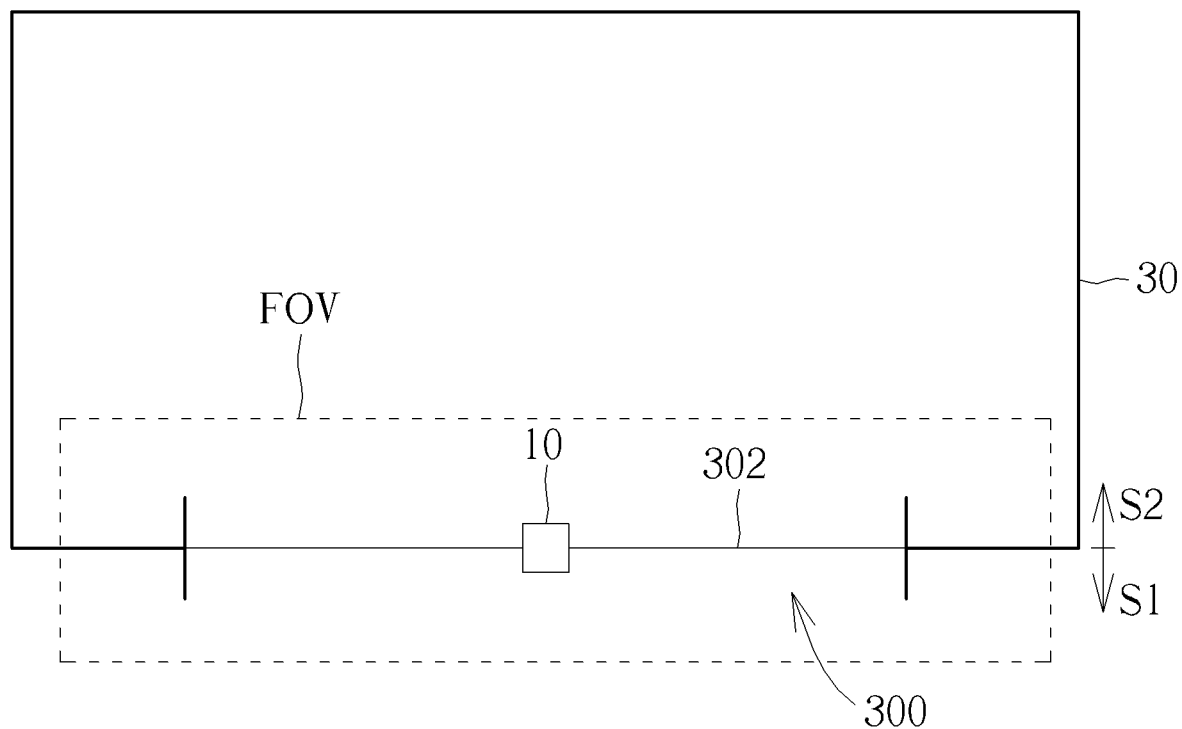
FIG. 2 is a schematic diagram illustrating the object counting device shown in FIG. 1 being disposed at a gate of a site.

Referring to FIGS. 1 and 2, FIG. 1 is a functional block diagram illustrating an object counting device 10 according to an embodiment of the invention and FIG. 2 is a schematic diagram illustrating the object counting device 10 shown in FIG. 1 being disposed at a gate 300 of a site 30.

As shown in FIG. 1, the object counting device 10 comprises an image capturer 100 and a processor 102, wherein the processor 102 is electrically connected to the image capturer 100. In this embodiment, the object counting device 10 may be a camera. In practical applications, the image capturer 100 may be a charge-coupled device (CCD) sensor or a complementary metal-oxide semiconductor (CMOS) sensor; the processor 102 may be a processor or a controller with data processing/calculating function. In general, the object counting device 10 may be further equipped with some necessary hardware or software components for specific purposes, such as a circuit board, a power supply, applications, a communication module, a lens, etc., and it depends on practical applications.

As shown in FIG. 2, the object counting device 10 may be disposed at a gate 300 of a site 30, so as to capture an image sequence related to the gate 300 within a field of view FOV of the object counting device 10. In practical applications, the site 30 may be a store, a public transportation or other sites, which need to count the number of objects entering or exiting from the sites. Furthermore, an entry/exit reference 302 is defined at the gate 300. In this embodiment, the entry/exit reference 302 is, but not limited to, a boundary line. Moreover, opposite sides of the gate 300 are defined as a first side S1 and a second side S2. In this embodiment, the first side S1 of the gate 300 is the outside of the site 30 and the second side S2 of the gate 300 is the inside of the site 30. However, in another embodiment, the first side S1 of the gate 300 may be the inside of the site 30 and the second side S2 of the gate 300 may be the outside of the site 30 according to practical applications.

Figure 3:
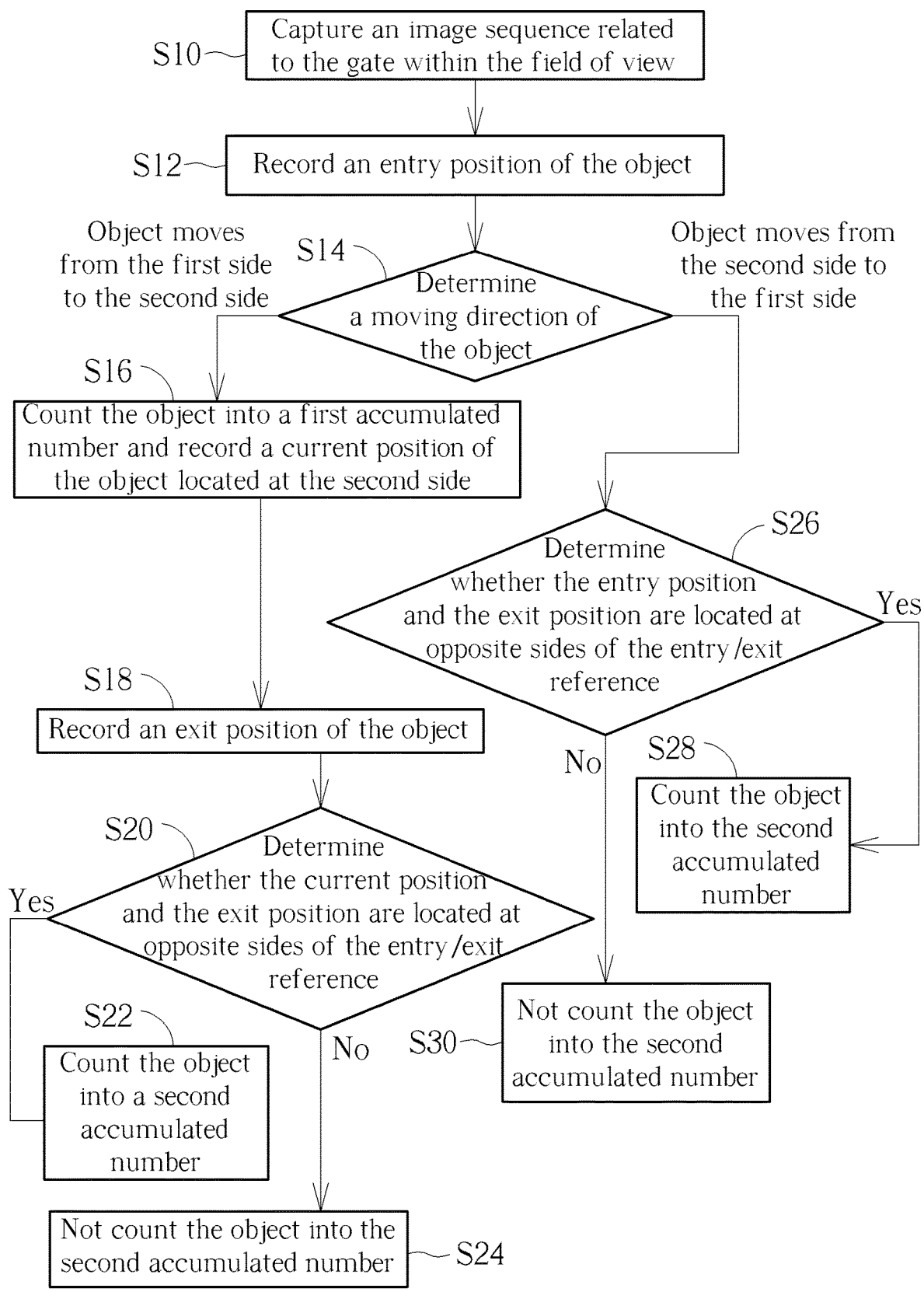
FIG. 3 is a flowchart illustrating an object counting method according to an embodiment of the invention.
Figure 4:
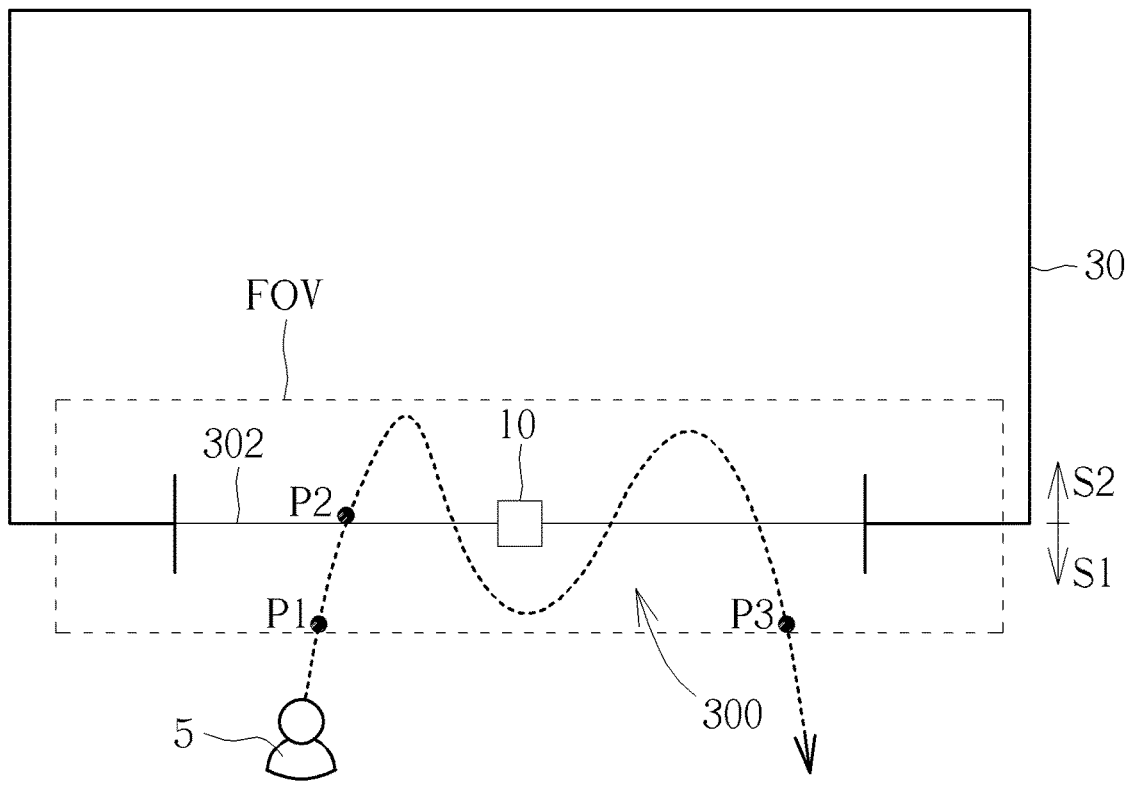
FIG. 4 is a schematic diagram illustrating an object moving with respect to the gate.
Figure 5:
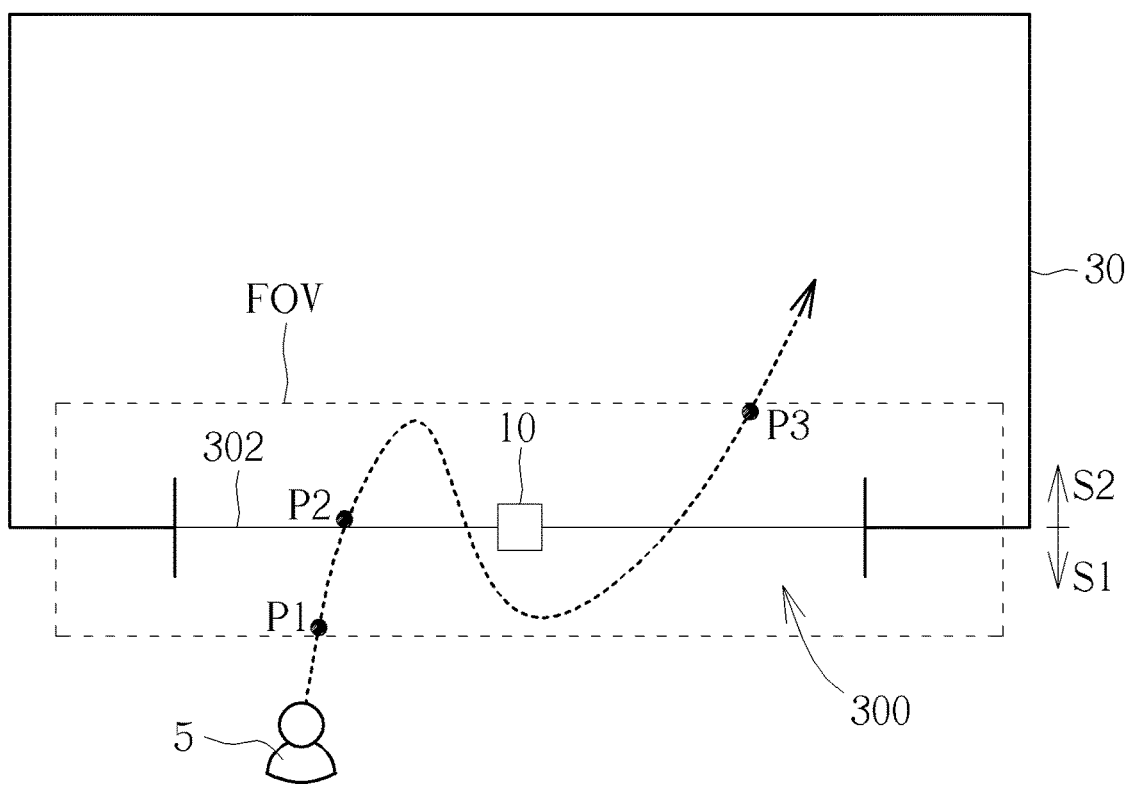
FIG. 5 is another schematic diagram illustrating the object moving with respect to the gate.
Figure 6:
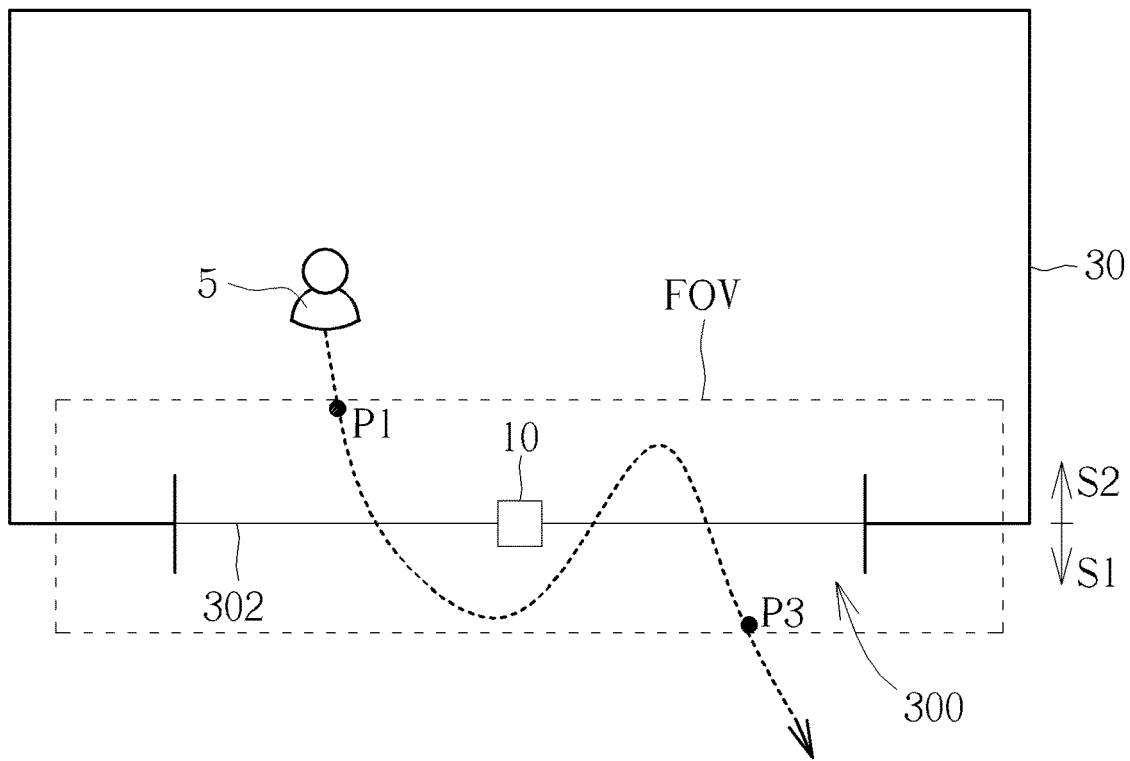
FIG. 6 is another schematic diagram illustrating the object moving with respect to the gate.
Figure 7:
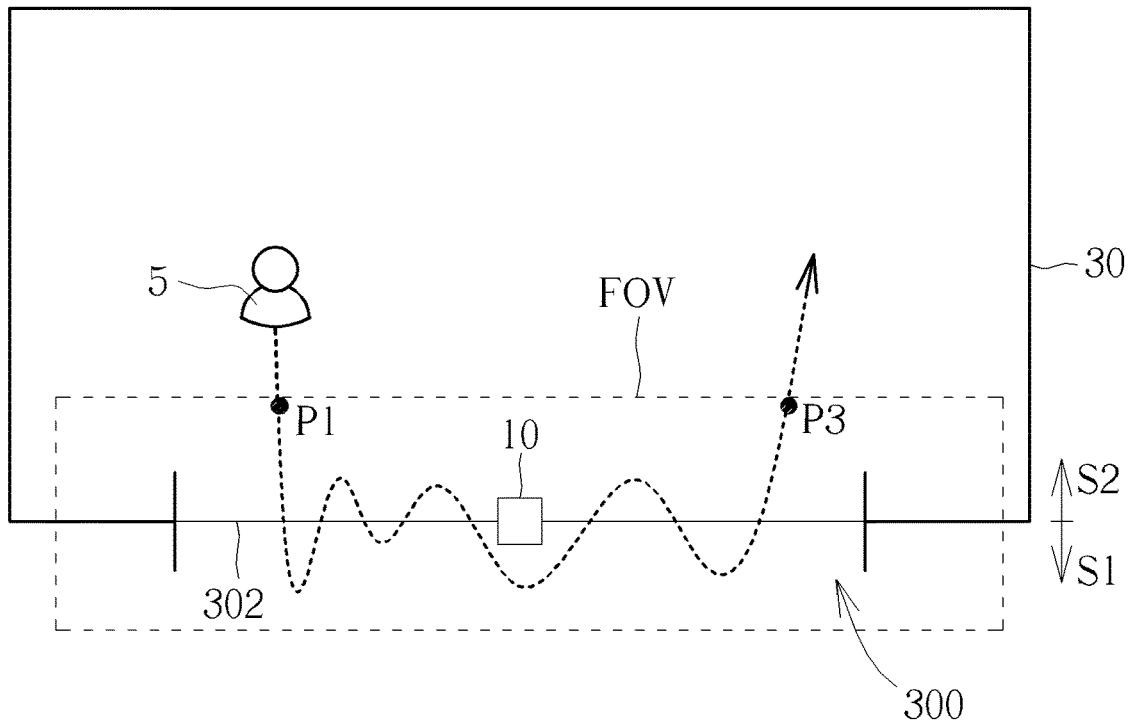
FIG. 7 is another schematic diagram illustrating the object moving with respect to the gate.

Referring to FIGS. 3 to 7, FIG. 3 is a flowchart illustrating an object counting method according to an embodiment of the invention, FIG. 4 is a schematic diagram illustrating an object 5 moving with respect to the gate 300, FIG. 5 is another schematic diagram illustrating the object 5 moving with respect to the gate 300, FIG. 6 is another schematic diagram illustrating the object 5 moving with respect to the gate 300, and FIG. 7 is another schematic diagram illustrating the object 5 moving with respect to the gate 300. The object counting method shown in FIG. 3 can be applied to the object counting device 10 shown in FIG. 1.

When the object counting device 10 performs the object counting method, first, the image capturer 100 captures an image sequence related to the gate 300 within the field of view FOV (step S10 in FIG. 3). In this embodiment, after capturing the image sequence, the processor 102 may analyze the image sequence by an image analyzing technology to determine whether an object (e.g. human, animal or other objects) exists in the image sequence. If an object exists in the image sequence, the processor 102 may further analyze a moving trajectory and a position of the object in the image sequence by the image analyzing technology. As shown in FIGS. 4 to 7, when an object 5 enters the field of view FOV, the processor 102 records an entry position P1 of the object 5 (step S12 in FIG. 3).

When the object 5 in the image sequence passes through the entry/exit reference 302 corresponding to the gate 300 within the field of view FOV first time, the processor 102 determines a moving direction of the object 5 (step S14 in FIG. 3). As shown in FIGS. 4 and 5, when the object 5 in the image sequence passes through the entry/exit reference 302 corresponding to the gate 300 within the field of view FOV first time, the processor 102 determines that the moving direction of the object 5 is from the first side S1 of the gate 300 towards the second side S2 of the gate 300. As shown in FIGS. 6 and 7, when the object 5 in the image sequence passes through the entry/exit reference 302 corresponding to the gate 300 within the field of view FOV first time, the processor 102 determines that the moving direction of the object 5 is from the second side S2 of the gate 300 towards the first side S1 of the gate 300. It should be noted that since the entry/exit reference 302 is a boundary line, the invention can determine that the object 5 has passed through the entry/exit reference 302 when the object 5 crosses the entry/exit reference 302.

As shown in FIGS. 4 and 5, when the processor 102 determines that the object 5 moves from the first side S1 of the gate 300 towards the second side S2 of the gate 300, the processor 102 counts the object 5 into a first accumulated number and records a current position P2 of the object 5 located at the second side S2 (step S16 in FIG. 3). In this embodiment, since the first side S1 of the gate 300 is the outside of the site 30 and the second side S2 of the gate 300 is the inside of the site 30, it means that the object 5 enters the site 30 from the outside to the inside when the object 5 passes through the entry/exit reference 302 within the field of view FOV first time. Accordingly, the aforesaid first accumulated number may be an accumulated entry number of the site 30.

Furthermore, when the processor 102 counts the object 5 into the first accumulated number, the processor 102 may make a mark to indicate that the object 5 has been counted into the first accumulated number. Accordingly, the invention can prevent the object 5 from being counted into the first accumulated number repeatedly when the object 5 passes through the entry/exit reference 302 within the field of view FOV back and forth.

When the object 5 exits from the field of view FOV, the processor 102 records an exit position P3 of the object 5 (step S18 in FIG. 3). Then, the processor 102 determines whether the current position P2 and the exit position P3 are located at opposite sides of the entry/exit reference 302 (step S20 in FIG. 3). When the processor 102 determines that the current position P2 and the exit position P3 are located at opposite sides of the entry/exit reference 302, the processor 102 counts the object 5 into a second accumulated number (step S22 in FIG. 3). When the processor 102 determines that the current position P2 and the exit position P3 are located at an identical side of the entry/exit reference 302, the processor 102 does not count the object 5 into the second accumulated number (step S24 in FIG. 3). Since the first side S1 of the gate 300 is the outside of the site 30 and the second side S2 of the gate 300 is the inside of the site 30, it means that the object 5 exits from the site 30 when the object 5 exits from the field of view FOV shown in FIG. 4. Accordingly, the aforesaid second accumulated number may be an accumulated exit number of the site 30.

As shown in FIG. 4, since the current position P2 and the exit position P3 are located at opposite sides of the entry/exit reference 302 (i.e. the object 5 has exited from the site 30), the processor 102 will count the object 5 into the second accumulated number. On the other hand, as shown in FIG. 5, since the current position P2 and the exit position P3 are located at an identical side of the entry/exit reference 302 (i.e. the object 5 has not exited from the site 30 yet), the processor 102 will not count the object 5 into the second accumulated number.

As shown in FIGS. 6 and 7, when the processor 102 determines that the object 5 moves from the second side S2 of the gate 300 towards the first side S1 of the gate 300, the processor 102 determines whether the entry position P1 and the exit position P3 are located at opposite sides of the entry/exit reference 302 (step S26 in FIG. 3). When the processor 102 determines that the entry position P1 and the exit position P3 are located at opposite sides of the entry/exit reference 302, the processor 102 counts the object 5 into the second accumulated number (step S28 in FIG. 3). When the processor 102 determines that the entry position P1 and the exit position P3 are located at an identical side of the entry/exit reference 302, the processor 102 does not count the object 5 into the second accumulated number (step S30 in FIG. 3).

As shown in FIG. 6, since the entry position P1 and the exit position P3 are located at opposite sides of the entry/exit reference 302 (i.e. the object 5 has exited from the site 30), the processor 102 will count the object 5 into the second accumulated number. On the other hand, as shown in FIG. 7, since the entry position P1 and the exit position P3 are located at an identical side of the entry/exit reference 302 (i.e. the object 5 has not exited from the site 30 yet), the processor 102 will not count the object 5 into the second accumulated number.

Figure 8:
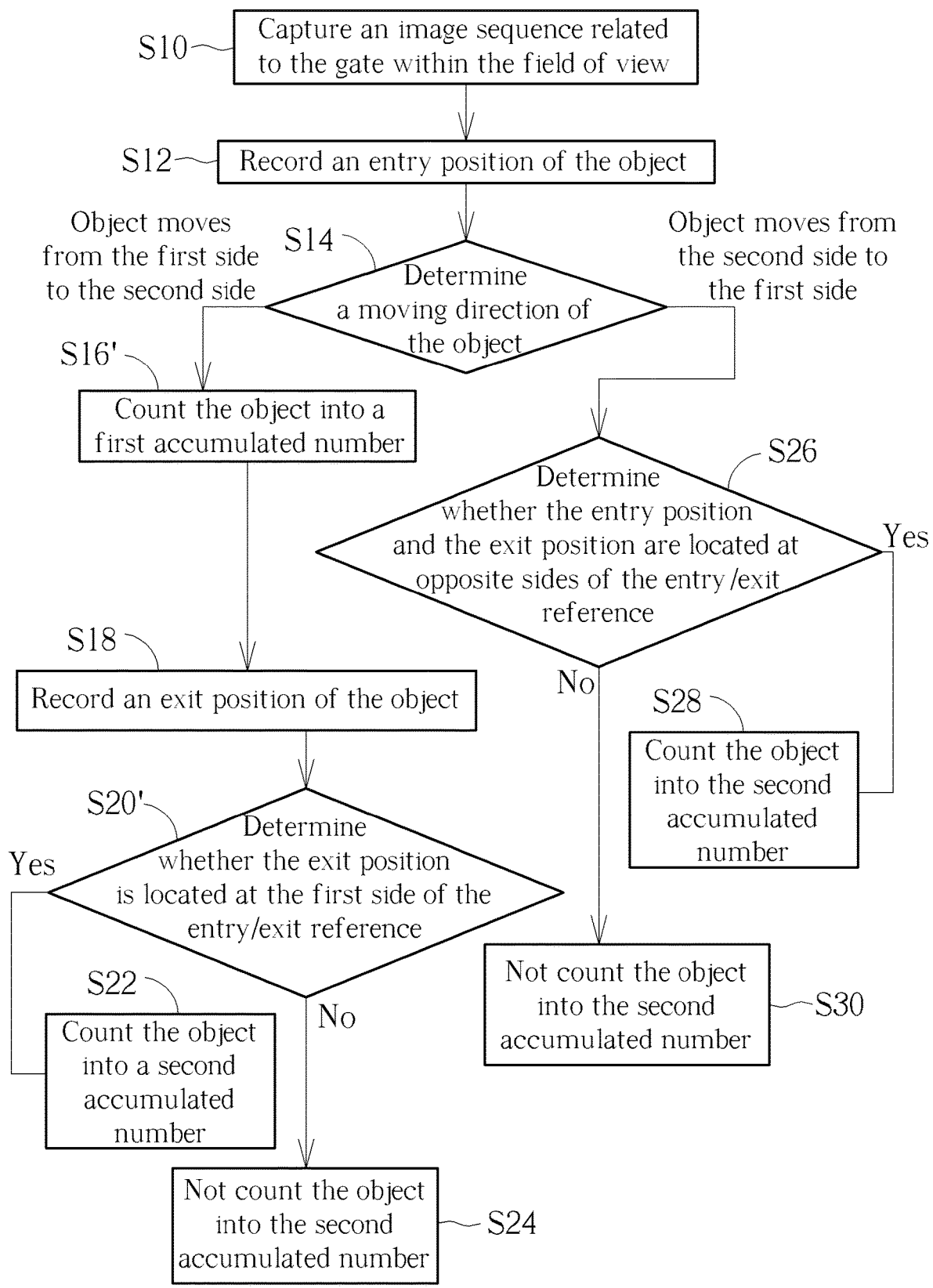
FIG. 8 is a flowchart illustrating an object counting method according to another embodiment of the invention.

Referring to FIG. 8, FIG. 8 is a flowchart illustrating an object counting method according to another embodiment of the invention. The object counting method shown in FIG. 8 can be applied to the object counting device 10 shown in FIG. 1. Except the differences between the steps 16', 20' shown in FIG. 8 and the steps 16, 20 shown in FIG. 3, the other steps shown in FIGS. 8 and 3 are substantially identical. Accordingly, only the steps 16', 20' shown in FIG. 8 are described along with FIGS. 4 and 5 in the following.

As shown in FIGS. 4 and 5, when the processor 102 determines that the object 5 moves from the first side S1 of the gate 300 towards the second side S2 of the gate 300, the processor 102 counts the object 5 into a first accumulated number (step S16' in FIG. 8). In other words, the difference between the step 16' shown in FIG. 8 and the step 16 shown in FIG. 3 is that the step 16' shown in FIG. 8 need not record the current position P2 of the object 5 located at the second side S2.

When the object 5 exits from the field of view FOV, the processor 102 records the exit position P3 of the object 5 (step S18 in FIG. 8). Then, the processor 102 determines whether the exit position P3 is located at the first side S1 of the entry/exit reference 302 (step S20' in FIG. 8). When the processor 102 determines that the exit position P3 is located at the first side S1 of the entry/exit reference 302, the processor 102 counts the object 5 into the second accumulated number (step S22 in FIG. 8). When the processor 102 determines that the exit position P3 is not located at the first side S1 of the entry/exit reference 302, the processor 102 does not count the object 5 into the second accumulated number (step S24 in FIG. 8).

As shown in FIG. 4, since the exit position P3 is located at the first side S1 of the entry/exit reference 302 (i.e. the object 5 has exited from the site 30), the processor 102 will count the object 5 into the second accumulated number. On the other hand, as shown in FIG. 5, since the exit position P3 is not located at the first side S1 of the entry/exit reference 302 (i.e. the exit position P3 is located at the second side S2 of the entry/exit reference 302, so the object 5 has not exited from the site 30 yet), the processor 102 will not count the object 5 into the second accumulated number.

Therefore, according to the object counting methods shown in FIGS. 3 and 8, the processor 102 may determine whether to count the object 5 into the second accumulated number according to the exit position P3.

Figure 9:
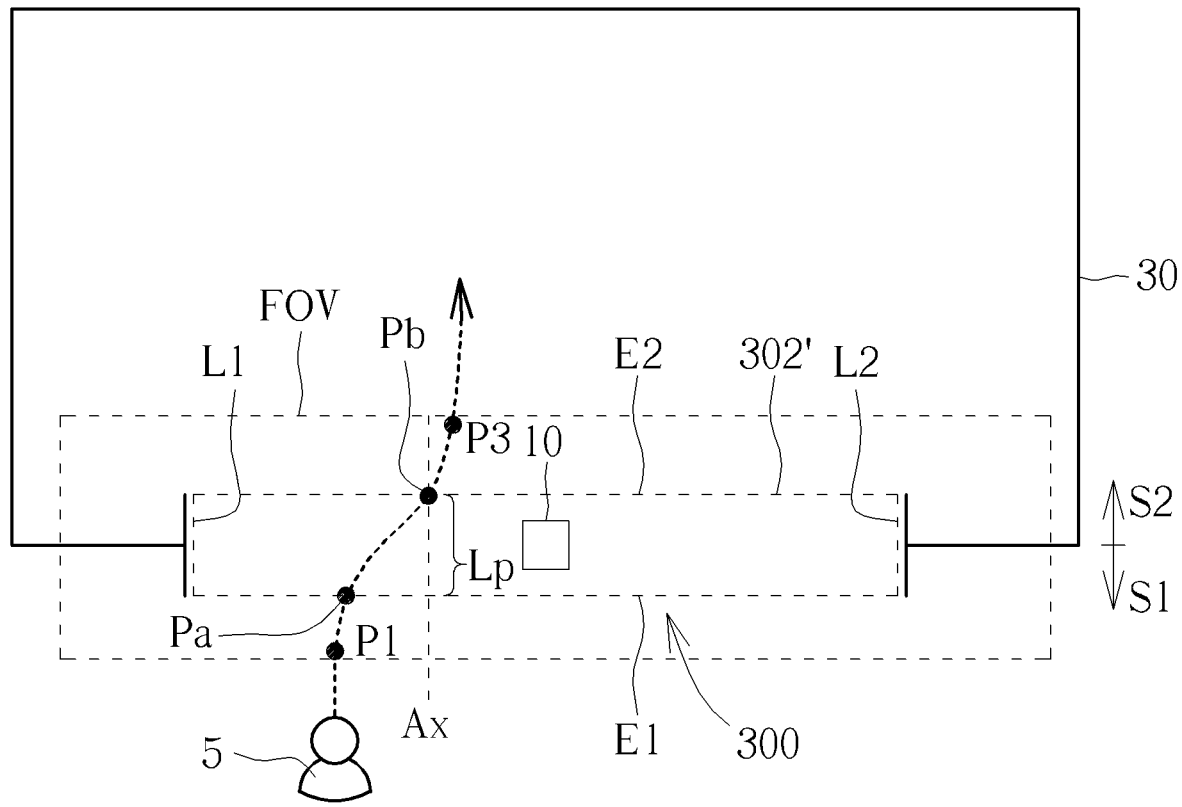
FIG. 9 is a schematic diagram illustrating an entry/exit reference according to another embodiment of the invention.

Referring to FIG. 9, FIG. 9 is a schematic diagram illustrating an entry/exit reference 302' according to another embodiment of the invention. As shown in FIG. 9, the entry/exit reference 302' is a counting channel, i.e. the entry/exit reference 302' covers a specific area. The specific area covered by the entry/exit reference 302' may be determined according to practical applications. In this embodiment, the entry/exit reference 302' may comprise two boundaries L1, L2, a first edge E1 and a second edge E2, wherein the first edge E1 and the second edge E2 connect the boundaries L1, L2. When the object 5 enters the entry/exit reference 302' through any of the boundaries L1, L2, the first edge E1 and the second edge E2, the processor 102 may set the entry position to be a start point Pa. When the object 5 exits from the entry/exit reference 302' through any of the boundaries L1, L2, the first edge E1 and the second edge E2, the processor 102 may set the exit position to be an end point Pb. In this embodiment, the object 5 enters the entry/exit reference 302' through the first edge E1 and exits from the entry/exit reference 302' through the second edge E2.

Then, the processor 102 may utilize the boundaries L1, L2 to define a reference axis Ax. In this embodiment, since the boundaries L1, L2 are parallel to each other, the reference axis Ax may be defined as a virtual line intersecting the end point Pb and substantially parallel to the boundaries L1, L2. Then, the processor 102 calculates a projection length Lp of a moving trajectory of the object 5 within the entry/exit reference 302' with respect to the reference axis Ax. Furthermore, the processor 102 may take a predetermined proportion of the length of the entry/exit reference 302' to be a threshold, e.g. the threshold may be 90 percent length of the entry/exit reference 302'. Then, the processor 102 compares the projection length Lp with the threshold. When the projection length Lp is larger than the threshold, the processor 102 determines that the object 5 passes through the entry/exit reference 302'. On the other hand, when the projection length Lp is not larger than the threshold, the processor 102 determines that the object 5 does not pass through the entry/exit reference 302'.

Figure 10:
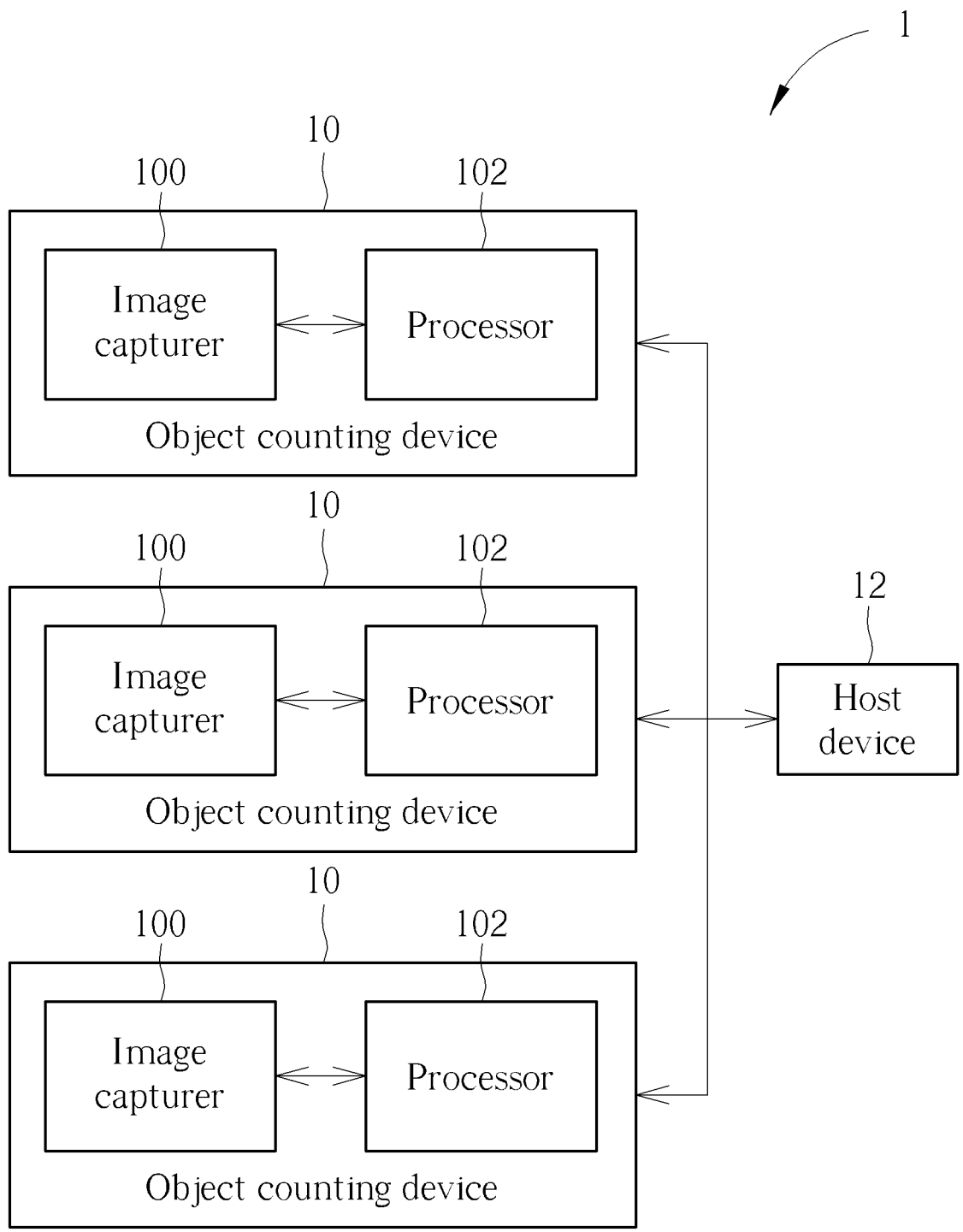
FIG. 10 is a functional block diagram illustrating an object counting system according to another embodiment of the invention.
Figure 11:
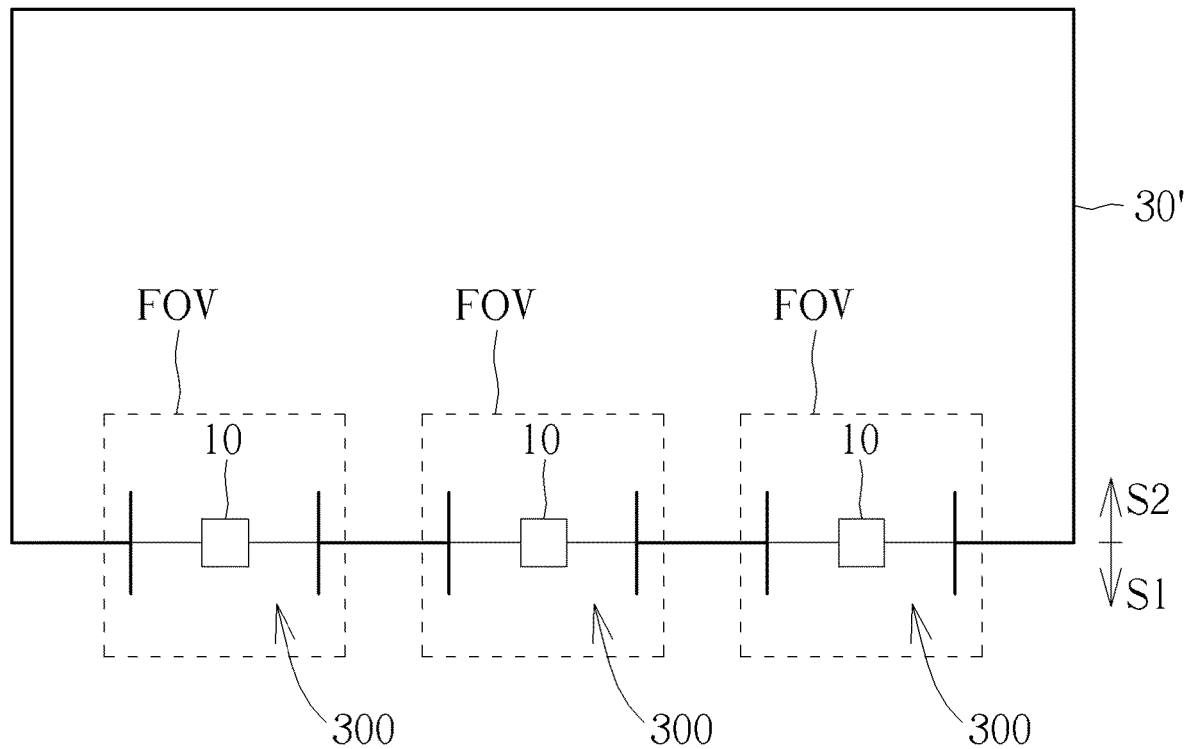
FIG. 11 is a schematic diagram illustrating a plurality of object counting devices shown in FIG. 10 being disposed at a plurality of gates of a site.

Referring to FIGS. 10 and 11, FIG. 10 is a functional block diagram illustrating an object counting system 1 according to another embodiment of the invention and FIG. 11 is a schematic diagram illustrating a plurality of object counting devices 10 shown in FIG. 10 being disposed at a plurality of gates 300 of a site 30'.

As shown in FIG. 10, the object counting system 1 comprises a plurality of the aforesaid object counting devices 10 and a host device 12, wherein the host device 12 communicates with the object counting devices 10. In this embodiment, the host device 12 may be a computer, a server or other electronic devices with data processing/calculating function. Furthermore, the host device 12 may communicate with the object counting devices 10 by wired or wireless manner according to practical applications.

As shown in FIG. 11, when the site 30' has a plurality of gates 300, the invention may dispose a plurality of object counting devices 10 at the gates 300 of the site 30'. Each of the object counting devices 10 can count objects moving with respect to the gate 300 by the aforesaid object counting method. Accordingly, the host device 12 can receive a plurality of the aforesaid first accumulated numbers and a plurality of the aforesaid second accumulated numbers from the object counting devices 10. Then, the host device 12 can calculate a first sum of the first accumulated numbers and calculate a second sum of the second accumulated numbers, so as to use the first sum and the second sum to analyze the number of customers who enter or exit from the site 30'.

As mentioned in the above, when the object in the image sequence passes through the entry/exit reference corresponding to the gate, the invention determines the moving direction of the object first and then determines the timing of counting the object according to the moving direction of the object. Accordingly, the invention can improve the accuracy of counting the number of customers who enter or exit from a specific site (e.g. store, public transportation, etc.) effectively.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An object counting device comprising:
   an image capturer capturing an image sequence related to a gate within a field of view, an object being in the image sequence; and
   a processor electrically connected to the image capturer, the processor performing steps of:
      determining the object moves from a first side towards a second side of an entry/exit reference corresponding to the gate; counting the object into a first accumulated number and recording a current position of the object, the object being located at the second side and the current position being within the field of view;
      determining the object exits the field of view;
      recording an exit position of the object, the exit position corresponding to an edge of the field of view;
      determining the current position and the exit position are on opposite sides of the entry/exit reference; and
      counting the object into a second accumulated number.

2. The object counting device of claim 1, wherein the entry/exit reference is a boundary line or a counting channel.

3. The object counting device of claim 1, wherein the processor further performs steps of: determining the object enters the field of view, recording an entry position of the object, determining the object moves from the second side towards the first side of the entry/exit reference, determining the entry position and the exit position are on opposite sides of the entry/exit reference, and counting the object into the second accumulated number.

4. The object counting device of claim 1, wherein the processor further performs steps of: making a mark to indicate that the object has been counted into the second accumulated number when the processor counts the object into the second accumulated number.

5. An object counting system comprising:
   a plurality of object counting devices, each of the object counting devices comprising:
      an image capturer capturing an image sequence related to a gate within a field of view, an object being in the image sequence; and
      a processor electrically connected to the image capturer, the processor performing steps of:
         determining the object moves from a first side towards a second side of an entry/exit reference corresponding to the gate;
         counting the object into a first accumulated number and recording a current position of the object, the object being located at the second side and the current position being within the field of view;
         determining the object exits the field of view;
         recording an exit position of the object, the exit position corresponding to an edge of the field of view;
         determining the current position and the exit position are on opposite sides of the entry/exit reference; and
         counting the object into a second accumulated number;
   a host device communicating with the object counting devices, the host device receiving a plurality of the first accumulated numbers and a plurality of the second accumulated numbers from the object counting devices, calculating a first sum of the first accumulated numbers, and calculating a second sum of the second accumulated numbers.

6. The object counting system of claim 5, wherein the entry/exit reference is a boundary line or a counting channel.

7. The object counting system of claim 5, wherein the processor further performs steps of: determining the object enters the field of view, recording an entry position of the object, determining the object moves from the second side towards the first side of the entry/exit reference, determining the entry position and the exit position are on opposite sides of the entry/exit reference, and counting the object into the second accumulated number.

8. The object counting system of claim 5, wherein the processor further performs steps of: making a mark to indicate that the object has been counted into the second accumulated number when the processor counts the object into the second accumulated number.

9. An object counting method comprising steps of:
   capturing an image sequence related to a gate within a field of view, an object being in the image sequence;
   determining the object moves from a first side towards a second side of an entry/exit reference corresponding to the gate;
   counting the object into a first accumulated number and recording a current position of the object, the object being located at the second side and the current position being within the field of view;
   determining the object exits the field of view;
   recording an exit position of the object, the exit position corresponding to an edge of the field of view;
   determining the current position and the exit position are on opposite sides of the entry/exit reference; and
   counting the object into a second accumulated number.

10. The object counting method of claim 9, wherein the entry/exit reference is a boundary line or a counting channel.

11. The object counting method of claim 9, further comprising steps of:
    determining the object enters the field of view;
    recording an entry position of the object;
    determining the object moves from the second side towards the first side of the entry/exit reference;
    determining the entry position and the exit position are on opposite sides of the entry/exit reference; and
    counting the object into the second accumulated number.

12. The object counting method of claim 9, further comprising step of:
    making a mark to indicate that the object has been counted into the second accumulated number when counting the object into the second accumulated number.

13. The object counting method of claim 9, further comprising steps of:
    receiving a plurality of the first accumulated numbers and a plurality of the second accumulated numbers; and calculating a first sum of the first accumulated numbers and calculating a second sum of the second accumulated numbers.

\* \* \* \* \*